United States Patent

[11] 3,589,766

| [72] | Inventor | Giorgio Bormioli |
| | | Via Galilio Galilei, 11 Padova, Italy |
| [21] | Appl. No. | 825,523 |
| [22] | Filed | May 19, 1969 |
| [45] | Patented | June 29, 1971 |
| [32] | Priority | May 21, 1968 |
| [33] | | Italy |
| [31] | | 16758A/68 |

[54] ACTUATING DEVICE FOR GRIPPING MEMBERS
6 Claims, 6 Drawing Figs.

[52] U.S. Cl.................................................. 294/106,
37/183, 292/256, 294/88, 294/106, 294/115
[51] Int. Cl......................................................... B65d 51/00,
B66c 3/00
[50] Field of Search............................................ 294/106,
115, 88, 69; 292/256.65, 256; 37/187, 183

[56] References Cited
UNITED STATES PATENTS
271,538  1/1883  Stone .......................... 294/106

Primary Examiner—Evon C. Blunk
Assistant Examiner—Douglas D. Watts
Attorney—B. Edward Shlesinger ABSTRACT: A device for actuating gripping or holding members is disclosed, such as the shells of a grab or the clamping jaws for the cover of a container, in which the members to which the closing or opening operation of the gripping members is entrusted to rods of a resiliently variable length which are hingedly connected, on the one hand, to the supporting member of the gripping members and, on the other hand, to a thrust ring which can be rotated about the supporting member. The thrust ring has an oscillatory movement between two angular end positions and its angular movement is controlled by a drive member.

ACTUATING DEVICE FOR GRIPPING MEMBERS

This invention relates to an actuating device for gripping members such as, for example the shells of a grab, the clamping jaws for the cover of a container and the like. More particularly, the inventive device is particularly adapted to actuate the gripping members of a connection for pipelines: however, since the application to such a connection has already been disclosed in the U.S. Pat. Application No. 734,819, no reference thereto will be made in this specification, but the examples will be given herein to the above-mentioned applications to a grab and a container.

In these cases, as in others, the gripping members are usually hinged to a supporting member (more particularly on the container itself in the case of application to a container) and are moved in several planes containing the axis of the supporting member.

To control the opening and closing of said gripping members devices of different kinds can be used, such as for example those comprising hydraulically controlled members such as jacks, regulating valves and so forth. These hydraulic devices do not permit, however, achieving the absolute grip reliability which is necessary in the application to grabs or other devices in which the reliability of the grip is a prerequisite. Other devices, of an exclusively mechanical nature, are, conversely, rather cumbersome, intricate and unreliable.

The object of the present invention is to provide a device for actuating gripping members which are hinged to a supporting element and are movable in several planes containing the axis of said supporting elements, the device combining a simple constructional arrangement with an absolute reliability and reduced cost, more particularly an absolute reliability in gripping and holding, that is, the absolute impossibility of undesirable opening of the gripping members.

These objects are achieved by the invention device by the agency of a plurality of rods having an elastically variable length which are hinged between the gripping members, and a common thrust ring which is rotatable about the supporting element for the gripping members by the agency of the reciprocal motion imparted thereto by a drive member.

The reciprocating rotation of the thrust ring takes place between two end positions. In the first position, the rods are in a location in which they substantially belong to planes of movement of the gripping members, whereas, in the second angular position of the thrust ring, the rods are inclined with respect to the planes aforementioned. If the length of the rods is such that their elastic portion is to be considered at rest in said second angular position of the thrust ring, it is apparent that, by rotating the thrust ring to bring it to the first angular position, the rods are compressed and store an amount of elastic energy which is such as to cause the gripping members to become closed, a certain amount of elastic energy being still stored in the rods so as to ensure a certain holding pressure in the gripping members. If then the rotation of the thrust ring is caused to proceed slightly beyond the position in which the rods lie in the planes of movement of the gripping members, the result is that, to open the gripping members again, the thrust ring must be rotated in the opposite directions since the force exerted by the elastic portion of the rods prevents reopening if such a rotation is not effected. The system thus becomes provided with a simple but efficient safety device for preventing undesirable opening of the gripping members, due to possible breakages of the drive member of the thrust ring.

To reopen the grinning members it is thus necessary that the thrust ring be rotated in the opposite direction so as to restore it to its second angular end position: due to the effect of said reverse rotation, the rods are inclined and thus are stretched and restored to their rest position, the result being a reopening of the gripping members. The reopening will be almost immediate since it will suffice that the rods overcome the dead center in which they belong to the planes of movement of the gripping members, for the energy stored in the elastic position of the rod to be completely released and the gripping members recalled backwards, the thrust ring itself being aided in its return stroke towards the second angular end position.

The principal advantage of the inventive device is that a reliable operation is achieved with an extremely simple arrangement, any undesirable opening of the gripping members being almost impossible. As a matter of fact, since, as has been outlined above, any undesirable reopening caused by the breakage of the control member for the thrust ring is prevented, such an undesirable reopening can take place only if the members which transfer the drive to the gripping members are broken, that is either the rods or the members hingeably connecting them to the gripping members and the thrust ring, are broken. These members, however, are of a mechanical nature so that their breakage is highly improbable: it can thus be concluded that the inventive device provides not only a high reliability of entering into action, but also a considerable reliability against undesirable reopening of the gripping members. In addition, if the gripping members are equally spaced apart from one another and the rods are all equal and hinged to the thrust ring at equally spaced apart points, the distances being also equal to the distances between the gripping members, during the closing motion, the gripping members are all advanced at the same speed and are closed with an equally distributed holding pressure. This equally distributed pressure is particularly useful in the case of application of the invention device to a container.

The features of the present invention will be better understood by referring to the accompanying drawings in which the device is shown as applied to the closing shells of a grab and to a container having a cover. It should be understood, in any case, that these applications are described and shown by way of example only since the inventive device can be applied to several others devices having gripping members.

Figure 1:
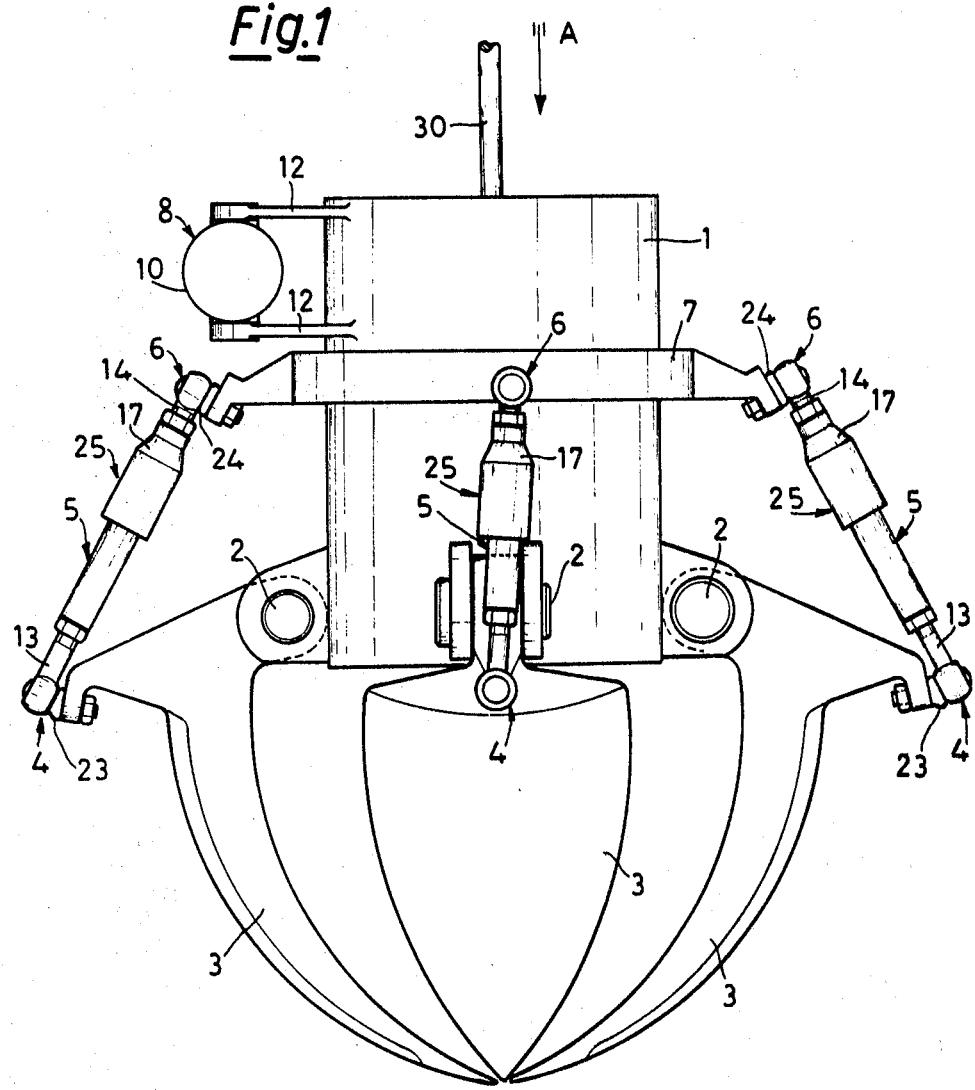
FIGS. 1 and 2 show in elevational view a grab whose closing shells are actuated by a device according to the invention, the grab being shown with its shells closed, and opened, respectively.

The grab shown in FIGS. 1 to 5 comprises a supporting element 1 having a spider 29 to attach a rope 30: on the member 1 are hinged by cylindrical pivots 2 four shells 3 which are the gripping members of the grab. These shells are equally spaced apart from one another and are adapted to be moved in different planes passing through the axis of the supporting element 1 and forming dihedral angles which are equal to one another. To each shell is hingedly connected, by the agency of a spherical joint 4 having a resilient collar 23, either end of a rod 5 whose length can be resiliently varied, the other ends of the rods 5 being pivoted, by spherical joints 6 spaced equally apart from one another and having resilient collars 24, to a thrust ring 7 which can be rotated about the body 1 and is coaxial therewith. The thrust ring 7 is reciprocally rotated between two end angular positions at one of which the rods 5 substantially belong to the planes of movement of the shells, at the other of which the rods 5 are inclined with respect to these planes due to the tangential forces transferred thereto by a hydraulic jack 8 arranged on a plane perpendicular to the axis of the body 1 and comprising a piston 9 and a cylinder 10. The free end of the rod of the piston 9 is hinged to a radial projection 11 of the thrust ring whereas the cylinder 10 is hinged in a substantially central position to stirrups 12 projecting from the body 1. The motion of the piston 9 relatively to the cylinder 10 is caused by the alternate connection of the two chambers of the cylinder to a fluid source and outlet. This alternating connection is preferably embodied by a hydraulic control station not shown in the drawings and comprising a manually actuated distributor valve.

The rods 5, which are all equal, comprise a first portion 13 and a second portion 14 (FIG. 5) which are connected to one another by an elastic joint 25 comprising a sleeve 17 screwed onto the portion 14 and having an axial internal cavity in which the free end of the portion 13 is permitted to slide, this sliding motion being biassed by a spring 15 on which is active a collar 16 mounted about the portion 13 and urged by a nut 27 screwed onto the portion 13. In addition, the portions 13 and 14 are connected by a pin 26 screwed to the portion 13 and slidable in the interior of the portion 14. A collar 21 of the pin 26 acts upon an inner projection 28 of the sleeve 17 to prevent separation of the two portions 13 and 14 when the rod is pulled. The length of the rod which is subjected neither to pulling nor to compression forces can thus be adjusted by the engagement between the sleeve 17 and the portion 14, and between the pin 26 and the portion 13. The maximum shortening due to compression can be conversely adjusted by means of the nut 27.

The operation of the device shown in FIGS. 1 to 5 will be described assuming that the device is initially in the configuration of FIGS. 2 and 4. Under these conditions, the piston 9 is in its full forward position in the cylinder 10. The thrust ring 7 is in either end position, the rods 5 are inclined with respect to the planes of movement of the shells 3 with their slidable portions in the position of maximum elongation without pulling forces on the rods (spring 15 released) and the shells 3 are open.

By actuating the distributor valve comprised in the hydraulic control station for the jack 8 so as to feed pressurized fluid (such as oil) in the left-hand (as viewed in FIG. 4) of the cylinder 10, the piston 9 moves backwards and causes, with the aid of the rotation of the cylinder 10 about the hinge point thereof with the stirrups 12 of the body 1, an anticlockwise rotation of the thrust ring 7. The presence of the spherical joints 4 and 6 acts in such a way that the rotation of the thrust ring originates a change of the position of the rods 5: these latter are positioned on the planes of movement of the shells, the spring 15 being compressed and storing elastic energy. As the rods 5 reach the position at which they belong to the planes of movement of the shells, the stored elastic energy is transferred to the shells 3 and these are rotated about their hinge points on the body 1 and are closed.

Figure 3:
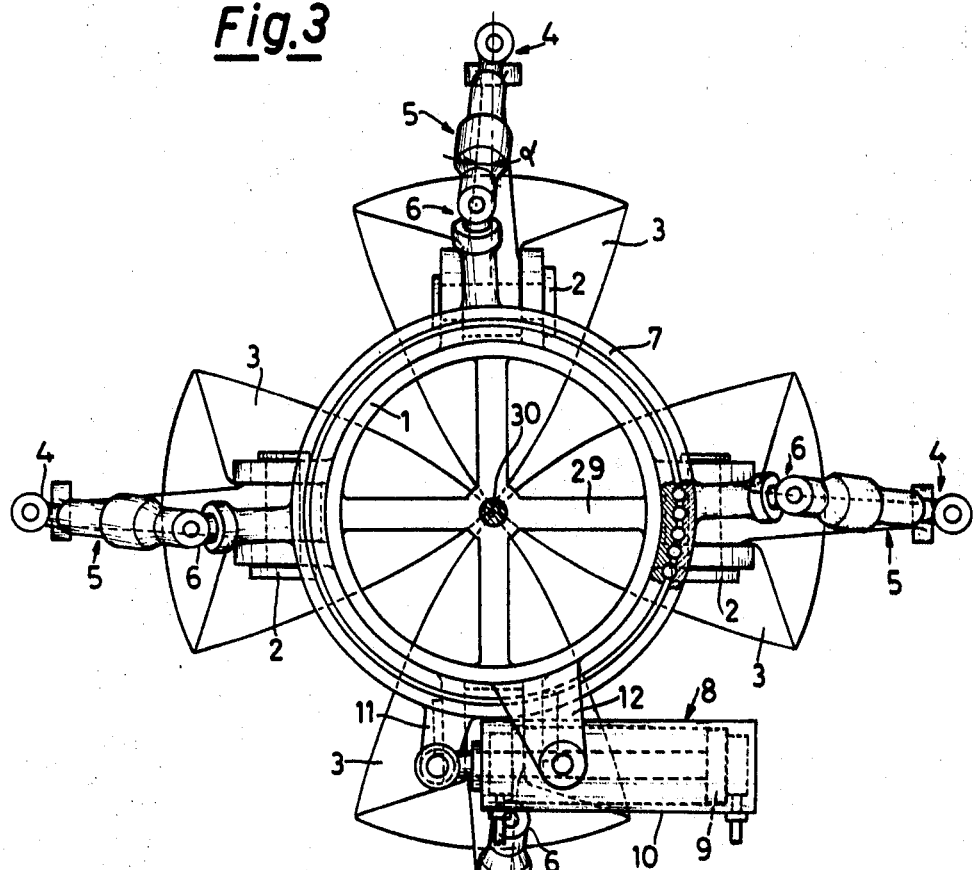
FIGS. 3 and 4 show the grab as viewed along the direction of the arrows A of FIGS. 1 and 2, with the shells open and closed, respectively.
Figure 5:
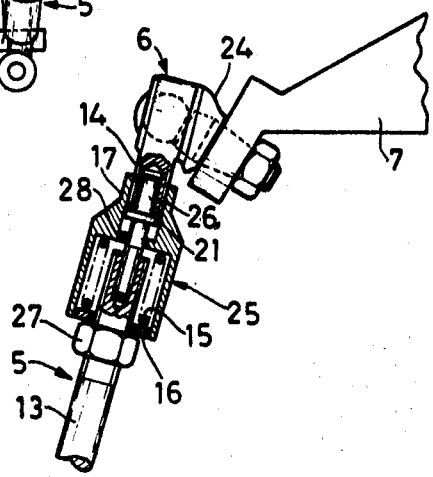
FIG. 5 is illustrative of a cross-sectional detail view of one of the rods which connect the shells to the thrust ring.

To obtain the mere closing of the shells, the thrust ring could even be stopped at the position where the rods belong to the planes of movement of the shells: conversely, to achieve a wholly reliable closing, which is safe against possible breakages of the control member for the jack 8, the rotation of the thrust ring is continued to a slight extent so as to incline the rods slightly in a direction opposite to the previous one. The final position of the rods when the shells are in their closed position is shown in FIGS. 1 and 3 and is defined by the end of stroke of the piston 9. As can be seen, the axes of the rods form small angles α with the radii which pass through the point of hinge with the shells, and this means that, to reopen the shells, the jack should be actuated in the opposite direction, a breakage in the fluid-feeding circuit being wholly unable to originate any undesirable opening of the shells.

To reopen the shells, pressurized fluid should be fed to the right-hand chamber (as viewed in FIG. 3) of the cylinder 10: by so doing, the piston 9 is advanced and causes a clockwise rotation of the thrust ring 7.

Figure 2:
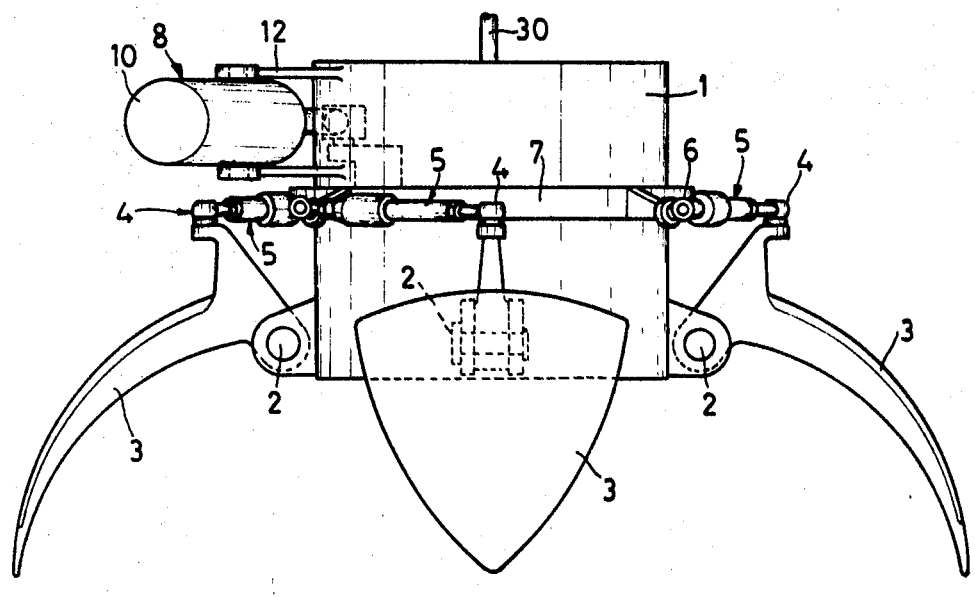
Figure 4:
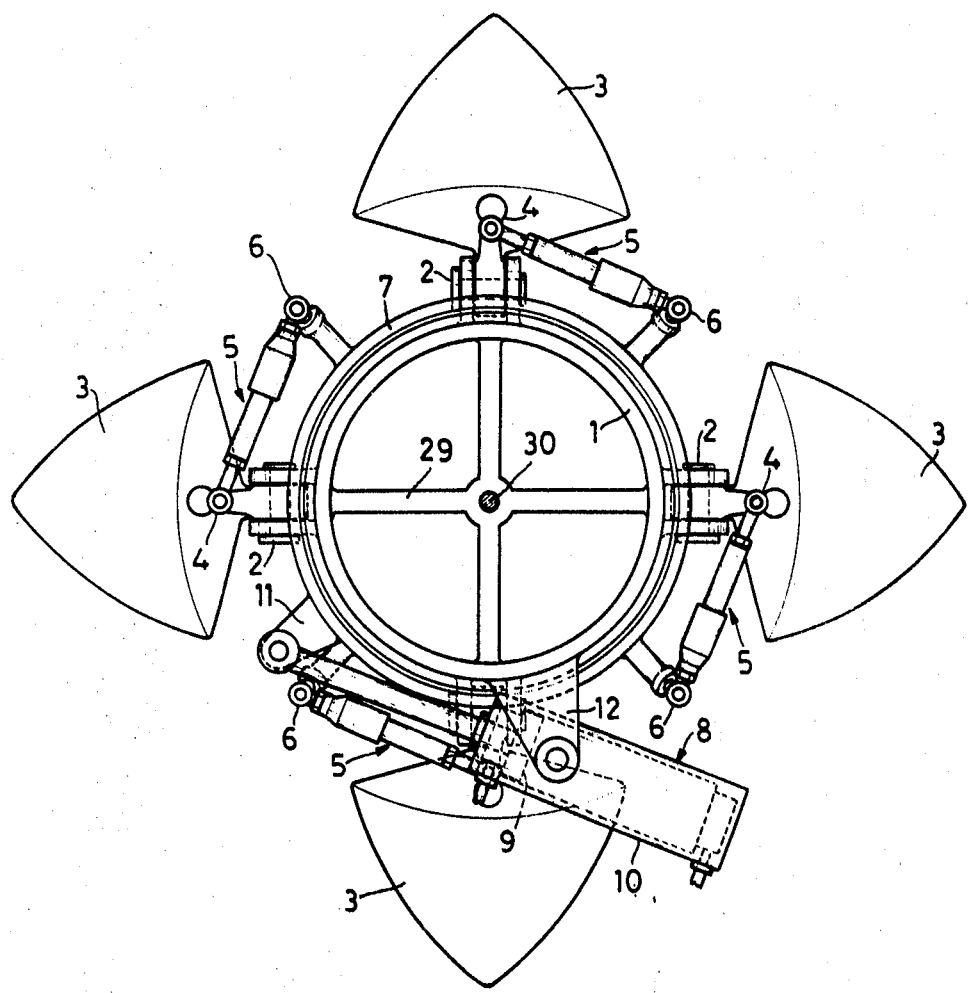

Once the dead center, which is the position at which the rods 5 belong to the planes of movement of the shells 3, has been overtaken, the rods 5 call the shells 3 back and reopen them, and the elastic energy stored therein assists the thrust ring in its motion to return it to the position of FIGS. 2 and 4.

Inasmuch as it would be impossible to reopen the shells in the case of a breakage in the fluid-feeding control station, a manually controlled pump could be placed in parallel with respect to the control station so as to enable the shells to be reopened under any circumstances.

Figure 6:
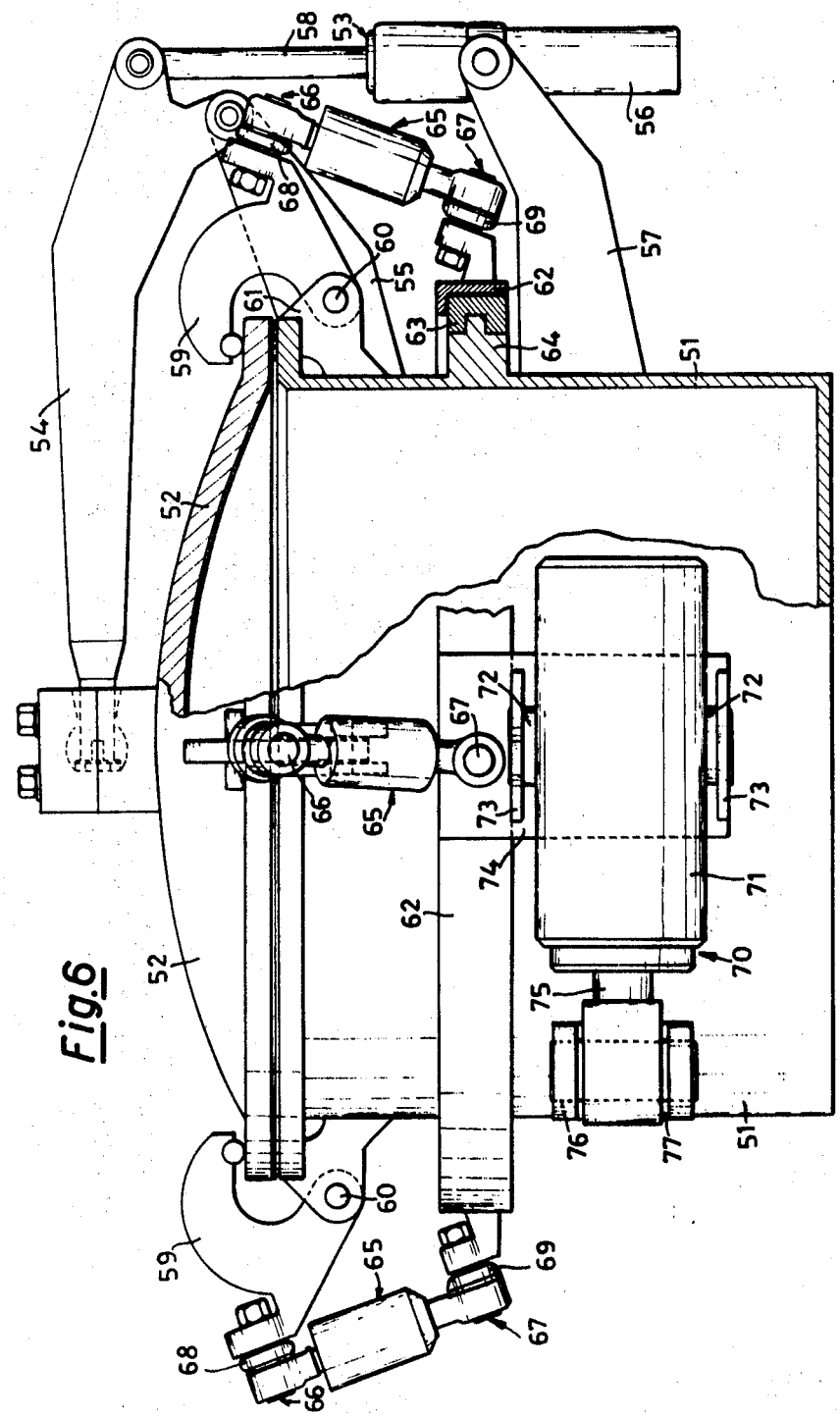
FIG. 6 shows, partly in elevational view and partly in cross section, a container having a cover fastened thereto by the agency of a device according to the invention.

FIG. 6 shows, in turn, the application of the device according to the invention to a cylindrical container 51 equipped with a cover 52 which is actuated by a hydraulic jack 53 via an arm 54 hinged to a stirrup 55 integral with the container body, the hydraulic jack comprising a cylinder 56 hinged to a stirrup 57 integral with the container body, and a piston (not shown in the drawing) whose rod 58 is hinged to the arm 54.

The peripheral edges of the cover 52 are urged against the matching peripheral edges of the container 51 by four equally spaced apart jaws 59: these are hinged by means of cylindrical pins 60 to stirrups 61 integral with the container body and are actuated by a thrust ring 62 which can be rotated about the container body by the agency of an antifriction metal ring 63 carried by a ring 64 affixed to the container. The connection between the jaws 59 and the thrust ring 62 is afforded by two rods 65 which are very much the same as the rods 5 shown in FIGS. 1 to 5, the rods 65 being hinged to the jaws 59 and to the thrust ring 62 by means of spherical joints 66 and 67 equipped with resilient collars 68 and 69. The thrust ring is oscillated between two end angular positions (the one corresponding to a position where the rods 65 belong to the planes of movement of the jaws 59, the other position corresponding to an inclination of the rods 65 with respect to the planes of movement), by a hydraulic jack 70 which comprises a cylinder 71 hinged by means of two pins 72 to two ears 73 protruding from a stirrup 74 integral with the thrust ring 62, and a piston (not shown in the drawings) whose stem 75 is hinged by means of a pin 76 to a U-shaped stirrup 77 integral with the container body.

The operation of the device of FIG. 6 is very much the same as that of the device of FIGS. 1 to 5 (so that no detailed description will be given) and, more particularly, it provides the closing of the jaws 59 and the consequent clamping of the cover 52 to the container 51 when the hydraulic jack 70 is in the configuration of FIG. 6 (closed condition), and the opening of the jaws 59 with the consequent unlocking of the cover 52 (to be opened subsequently by actuating the hydraulic jack 53) when the hydraulic jack 70 is brought to its other possible position (open condition) due to sliding of the cylinder 71 relatively to the piston and the relevant stem 75 (towards the right as viewed in FIG. 6). The rods 65 behave in the same way as the rods 5 of the device shown in FIGS. 1 to 5, that is, they are inclined in the opening stage of the jaws 59 and are restored to the position where they substantially belong to the planes of movement of the jaws as these are being closed. The elastic properties of the rods 65 fulfill the same function of the ones of the rods 5 and in a similar manner.

I claim:

1. A device for actuating gripping members, such as the shells of a grab or the clamping jaws for a container cover, hinged to a supporting element and movable in different planes containing the axis of the supporting element, comprising a plurality of rods having a resiliently variable length and hinged between the gripping members and a common thrust ring which is rotatable about the axis of the supporting element, a manually operable member for rotating said thrust ring, said thrust ring being rotatable between two end angular positions, a first angular position in which the rods lie substantially in the planes of movement of the gripping members, and a second end angular position of the thrust ring in which the rods are inclined with respect to said planes of movement.

2. A device according to claim 1 wherein when the thrust ring is in its first angular position, the rods are inclined with respect to the planes of movement of the gripping members in a direction which is opposite to the direction of the rods in the second end angular position of the thrust ring.

3. A device according to claim 1, wherein the rods are composed by two aligned portions which are connected to one another by an elastic joint, the resilient members in said joint being in their best position when the thrust ring is in its second end angular position; whereas they are compressed when the thrust ring is in its first end angular position.

4. A device according to claim 2, wherein means are provided to adjust the rod length in the at rest position, along with means for adjusting the maximum shortening due to the compression of the rods.

5. A device according to claim 1, wherein the rods are hingedly connected to the thrust ring and to the gripping members by means of spherical joints.

6. A device according to claim 1, wherein the rods are all of the same length and their hinge points to the thrust ring are equally spaced apart a distance which is equal to the distance between the points at which the gripping members are hinged to the supporting element.